United States Patent [19]

Sekimura

[11] Patent Number: 4,556,288

[45] Date of Patent: Dec. 3, 1985

[54] LIQUID CRYSTAL DEVICE WITH ANTI-REFLECTION FUNCTION IN DIELECTRIC LAYER

[75] Inventor: Nobuyuki Sekimura, Kawasaki, Japan

[73] Assignee: Canon Kabushiki Kaisha, Tokyo, Japan

[21] Appl. No.: 435,961

[22] Filed: Oct. 22, 1982

[30] Foreign Application Priority Data

| Oct. 27, 1981 | [JP] | Japan | 56-172556 |
| Oct. 28, 1981 | [JP] | Japan | 56-173541 |
| Oct. 28, 1981 | [JP] | Japan | 56-173542 |
| Oct. 28, 1981 | [JP] | Japan | 56-173543 |
| Oct. 29, 1981 | [JP] | Japan | 56-173557 |

[51] Int. Cl.$^4$ .............. G02F 1/13; G02F 1/135
[52] U.S. Cl. ................. 350/339 R; 350/339 D; 350/339 F; 350/347 V
[58] Field of Search ........... 350/334, 338, 336, 339 R, 350/339 D, 339 F, 340, 341, 347 R, 347 V, 348; 252/299.01

[56] References Cited

U.S. PATENT DOCUMENTS

| 3,736,047 | 5/1973 | Gelber | 350/338 |
| 3,737,210 | 6/1973 | Howe | 350/1 |
| 3,781,090 | 12/1973 | Sumita | 350/164 |
| 3,814,501 | 6/1974 | Schindler | 350/338 |
| 4,068,923 | 11/1978 | Toida | 350/339 R |
| 4,185,894 | 1/1980 | Hilton | 350/338 |
| 4,201,453 | 5/1980 | Kobale | 350/340 |
| 4,240,710 | 12/1980 | Kozaki | 350/339 R |
| 4,248,502 | 2/1981 | Bechteler | 350/339 R |
| 4,385,805 | 5/1983 | Channin | 350/336 |
| 4,408,837 | 10/1983 | Kozaki | 350/336 |

FOREIGN PATENT DOCUMENTS 0614798 12/1979 Switzerland .............. 350/338

OTHER PUBLICATIONS

Kerllenevich, et al., "New Simple Model . . . ", Mol. Cryst. Liq. Cryst., 1981, vol. 70, pp. 95–104.

*Primary Examiner*—Teddy S. Gron
*Assistant Examiner*—Catherine S. Kilby
*Attorney, Agent, or Firm*—Fitzpatrick, Cella, Harper & Scinto

[57] ABSTRACT

A liquid crystal device wherein the liquid crystal is sandwiched between electrode-substrates. At least one of the electrode-substrates is composed of a transparent substrate, a transparent electrode formed thereon and a transparent dielectric layer formed on the electrode and having a refractive index changing continuously or stepwise in the direction of thickness, thereby reducing the light to be reflected by the transparent electrode.

6 Claims, 21 Drawing Figures

4,556,288

LIQUID CRYSTAL DEVICE WITH ANTI-REFLECTION FUNCTION IN DIELECTRIC LAYER

BACKGROUND OF THE INVENTION

1. Field of the Invention

The present invention relates to a liquid crystal device adapted for use as a display element or a shutter element, for example.

2. Description of the Prior Art

There are already known various types of liquid crystal devices, such as dynamic scattering mode type, twisted nematic type, guest-host type etc., but in any type a voltage is applied across a pair of electrodes sandwiching the liquid crystal.

In any type of the liquid crystal device, at least one of the electrodes is composed of a transparent electrode, which tends to show strong light reflection due to the high refractive index of the material constituting said transparent electrode. Such reflection hinders proper observation and significantly deteriorates the quality and contrast of the display. Also one may confuse the operative state and inoperative state of the device if such reflection is strong. A proposal for reducing such reflection from the transparent electrode pattern has been made in Japanese Patent Application Laid-open No. 52789/1981. According to this proposal, the transparent electrode is provided thereon with a dielectric layer of a determined thickness with a uniform refractive index. It is however difficult, with such structure, to sufficiently avoid the reflection over the entire visible wavelength range from 400 to 700 mμ.

SUMMARY OF THE INVENTION

It is an object of the present invention to provide a solution for the above-mentioned problem. In order to achieve this, there is provided, according to the present invention, a liquid crystal device wherein at least one of electrode-substrates is composed of a transparent substrate, a transparent electrode formed on the substrate and a thin dielectric layer formed on the electrode and having a refractive index changing continuously or stepwise in the direction of thickness to eliminate the reflection of light to be generated at the interface between the transparent electrode and the transparent substrate.

In the liquid crystal device of the present invention, a face of said thin dielectric layer contacting the liquid crystal may be so treated as to orient the liquid crystal, without affecting the function of prevention of reflection.

In an embodiment of the present invention to be explained later, satisfactory prevention of the reflection is achieved by establishing such relation that $n_0 < n_1$ and $n_3 > n_{LC}$, wherein $n_0$, $n_1$, $n_3$ and $n_{LC}$ are refractive indexes respectively of the substrate, transparent electrode, thin dielectric layer at a side facing the liquid crystal, and liquid crystal.

DESCRIPTION OF THE PREFERRED EMBODIMENTS

Figure 1:
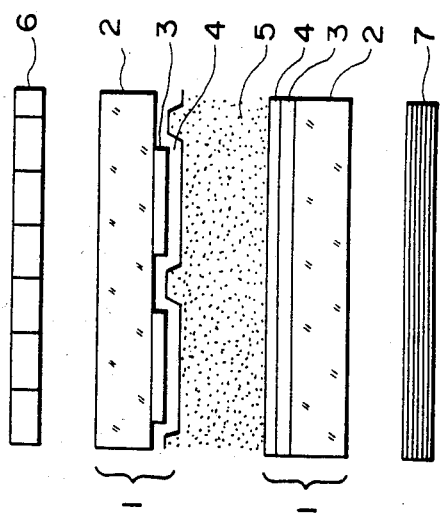
FIG. 1 is a schematic view showing an embodiment of the liquid crystal device of the present invention.

FIG. 1 is a cross-sectional view of a liquid crystal device utilizing a twisted nematic type liquid crystal and embodying the present invention, wherein each electrode-substrate 1 is composed of a transparent substrate 2, a transparent electrode 3 provided thereon and a thin dielectric layer 4 provided on said electrode in order to reduce the undesirable light reflection to be generated at the interface between said transparent substrate 2 and said transparent electrode 3. Liquid crystal 5 is sandwiched between a pair of said electrode-substrates, and they are in turn disposed between a pair of linearly polarizing plates 6, 7. These polarizing plates are so disposed that the polarizing axes thereof are mutually perpendicular. In FIG. 1, the spacers and sealants for maintaining the liquid crystal in place are omitted for the purpose of simplicity. In the embodiment shown in FIG. 1, the thin dielectric layer for preventing the reflection is provided on both substrates, but it is to be noted that such thin dielectric layer, even when provided only on one substrate, effectively reduces the reflection as compared with the conventional liquid crystal device.

Figure 2:
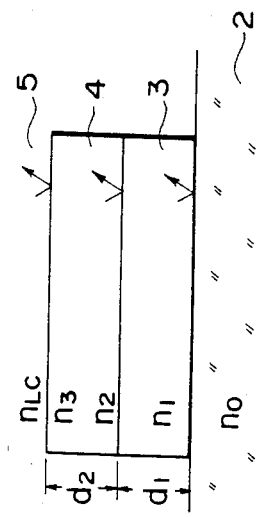
FIG. 2 is a schematic view showing the structure of the electrode-substrate to be used in the liquid crystal device of the present invention.

FIG. 2 shows the details of the electrode-substrate shown in FIG. 1, wherein $n_0$ is the refractive index of the transparent substrate 2, $n_1$ that of transparent electrode 3, $n_2$ that of the thin dielectric layer 4 at a side thereof facing said transparent electrode 3, $n_3$ that of the thin dielectric layer 4 at a side thereof facing the liquid crystal 5, and $n_{LC}$ that of said liquid crystal 5, while $d_1$ is the geometrical thickness of the transparent electrode 3 and $d_2$ is that of the thin dielectric layer. In the present invention, said thin dielectric layer is provided as an anti-reflection layer for reducing the light reflection from the transparent electrode, and the reduction of said reflection is finally achieved by optimizing the amplitude and phase conditions of the aforementioned components, i.e. transparent substrate, transparent electrode, thin dielectric layer and liquid crystal constituting the liquid crystal device.

Figure 3A:
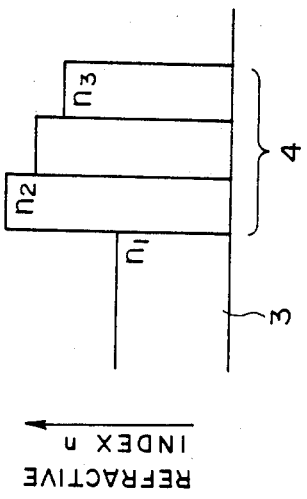
FIGS. 3A and 3B illustrate examples of the changing refractive index of the thin dielectric layer provided on the substrate to be used in the liquid crystal device of the present invention.
Figure 3B:
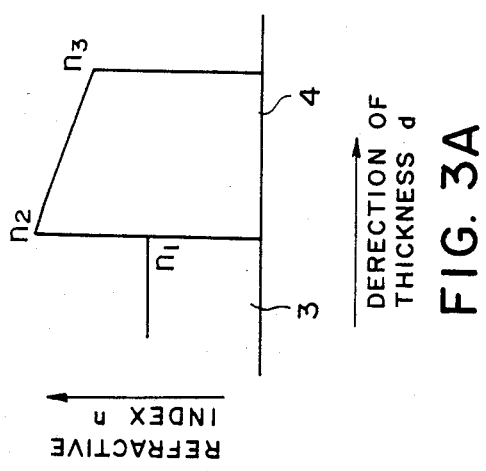

Said thin dielectric layer 4 has a refractive index changing in the direction of thickness thereof, either continuously as shown in FIG. 3A or stepwise in at least three steps as shown in FIG. 3B.

The optical thickness for the layers are expressed by $n_1 d_1$ for the transparent electrode 3, and by $$\int_0^{d2} n(d) \Delta d,$$

wherein n(d) represents the distribution of the refractive index in the direction of thickness d and becomes a stepped function in case the refractive index shows stepwise changes.

Figure 4A:
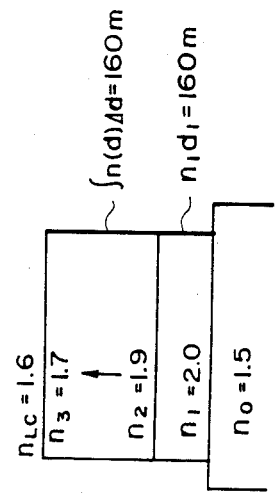
FIGS. 4A and 4B are schematic views showing examples of the electrode-substrate of the liquid crystal device according to the present invention.
Figure 4B:
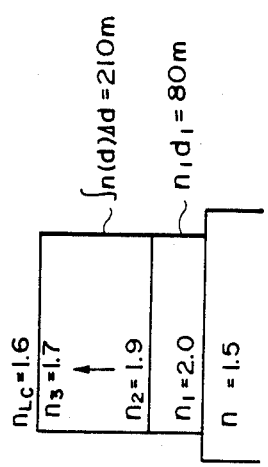

FIGS. 4A and 4B show examples of the electrode-substrate adapted for use in the liquid crystal device of the present invention. In the example shown in FIG. 4A, a transparent substrate having a refractive index of 1.5 is provided thereon with a transparent electrode having a refractive index of 2.0 and an optical thickness of 80 mµ or a geometrical thickness of 40 mµ. The transparent electrode is in turn provided thereon with a dielectric layer having an optical thickness of 210 mµ and a refractive index changing from 1.9 to 1.7. The liquid crystal to be used in combination has a refractive index of 1.6.

In the example shown in FIG. 4B, a transparent substrate having a refractive index of 1.5 is provided thereon with a transparent electrode having a refractive index of 2.0 and an optical thickness of 160 mµ or a geometrical thickness of 80 mµ. The transparent electrode in turn provided thereon with a dielectric layer having an optical thickness of 160 mµ and a refractive index changing from 1.9 to 1.7.

Figure 5B:
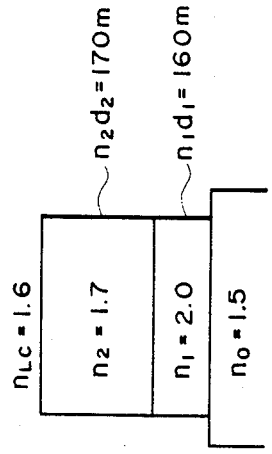
FIGS. 5A and 5B are schematic views showing conventional electrode-substrates.
Figure 5A:
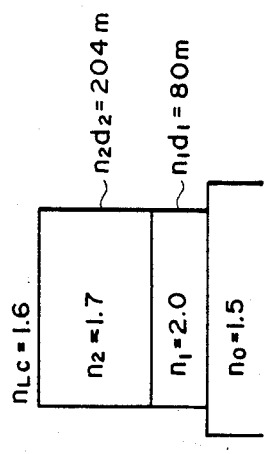

FIGS. 5A and 5B show examples of conventional electrode-substrate, respectively corresponding to the structures shown in FIGS. 4A and 4B. The structures show in FIGS. 5A and 5B are the same as those shown in FIGS. 4A and 4B except that the dielectric layer has a uniform refractive index of 1.7 and has an optical thickness of 204 or 170 mµ.

Figure 6:
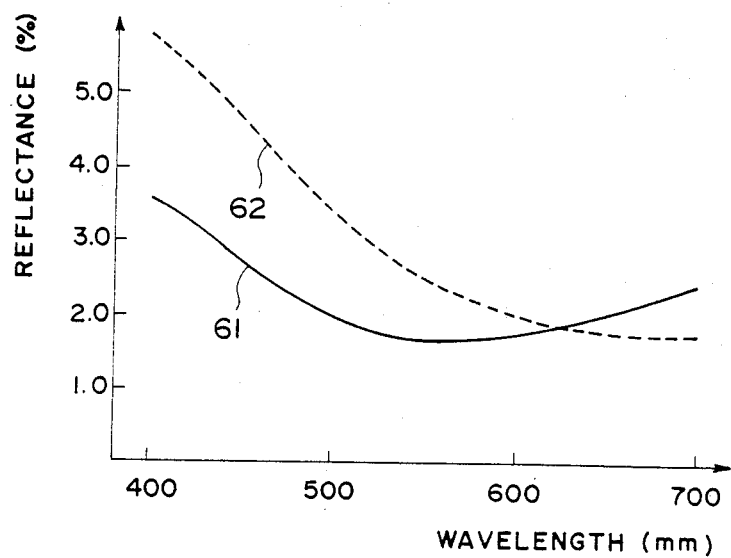
FIGS. 6 and 7 are charts each showing the spectral reflectance of the electrode-substrate of the liquid crystal device according to the present invention as compared with that of the conventional electrode-substrates.

FIG. 6 shows the spectral reflectance characteristic of the electrode-substrate of the structure shown in FIG. 4A (curve 61) as compared with that of the conventional electrode-substrate shown in FIG. 5A (curve 62). As is observed from FIG. 6, the reflectance of the electrode-substrate of the liquid crystal device according to the present invention is essentially lower than 3.5% over the entire visible wavelength range, significantly lower than the reflectance of the conventional electrode-substrate and less dependent on the wavelength.

Figure 7:
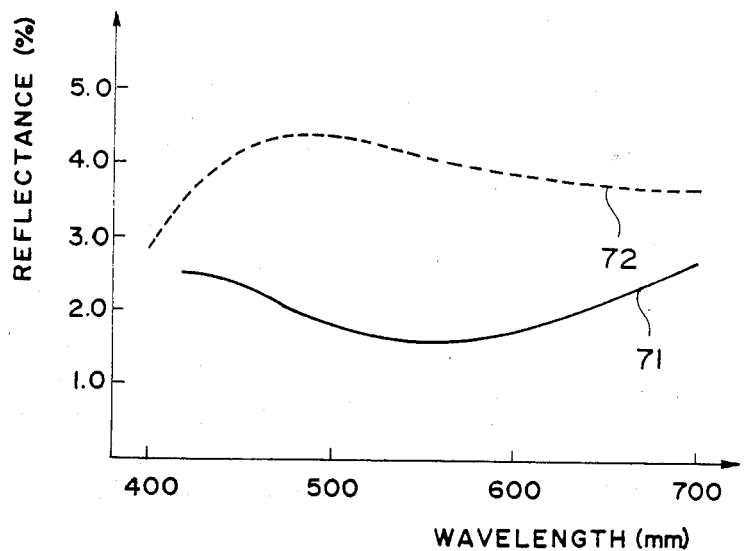

FIG. 7 shows the spectral reflectance characteristic of the electrode-substrate of the structure shown in FIG. 4B (curve 71) as compared with that of the conventional electrode-substrate shown in FIG. 5B (curve 72). As is observed from FIG. 7, the reflectance of the electrode-substrate of the liquid crystal device according to the present invention is essentially lower than 2.5% over the entire visible wavelength range, and substantially lower than the reflectance of the conventional electrode-substrate.

In the liquid crystal device of the present invention, the reflection preventive effect is further improved when the aforementioned electrode-substrate is arranged according to either one of the following four cases.

First case: in which $n_1 d_1$ and $$\int_0^{d2} n(d) \cdot \Delta d$$

are so selected as to satisfy the following relation:

$$0.2 \cdot (2N_1 - 1) \cdot \lambda \leq n_1 d_1 \leq 0.3 \cdot (2N_1 - 1) \cdot \lambda \quad (1)$$

$$0.2 \cdot (2N_1 - 1) \cdot \lambda \leq \int_0^{d2} n(d) \cdot \Delta d \leq 0.3 \cdot (2N_2 - 1) \cdot \lambda$$

wherein λ is the design wavelength, and $N_1$ and $N_2$ are arbitrary positive integers.

Figure 8:
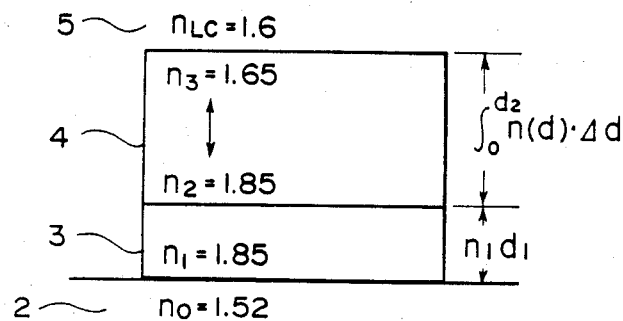
FIG. 8 is a schematic view showing an example of the electrode-substrate of the liquid crystal device according to the present invention.

FIG. 8 shows an example of the electrode-substrate for use in the liquid crystal device of the present invention, wherein the refractive index is 1.52 in the substrate 2, 1.85 in the transparent electrode 3, 1.85 and 1.65 in the thin dielectric layer 4 respectively at a side thereof facing the transparent electrode and at a side thereof facing the liquid crystal, and 1.6 in the liquid crystal 5.

Figure 9:
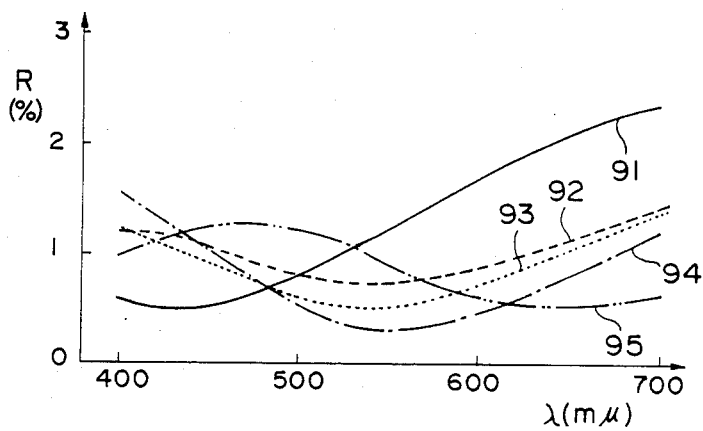
FIGS. 9 to 11 are charts showing the reflection characteristics of the electrode-substrates, belonging to a first group, of the liquid crystal devices according to the present invention.

FIG. 9 shows the spectral reflectance charactristics, in the visible wavelength range, of different electrode-substrates having different optical thickness satisfying the above relation (1) for a design wavelength of λ=640 mµ and for $N_1=N_2=1$ and under the conditions of refractive indexes shown in FIG. 8. The values of optical thickness $n_1 d_1$ and $$\int_0^{d2} n(d) \cdot \Delta d$$

corresponding to curves 91–95 are shown in Table 1:

TABLE 1

| Curve | $n_1 d_1$ | $\int_0^{d2} n(d) \cdot \Delta d$ |
|---|---|---|
| 91 | 128 mµ | 128 mµ |
| 92 | 128 | 192 |
| 93 | 160 | 160 |
| 94 | 192 | 128 |
| 95 | 192 | 192 |

Figure 10:
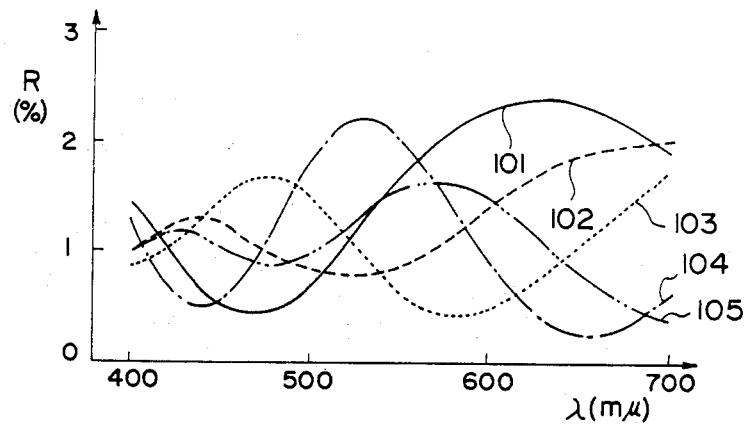

Similarly, FIG. 10 shows the spectral reflectance characteristics, in the visible wavelength range, of different electrode-substrates having different optical thickness satisfying the above relation (1) for a design wavelength of 640 mµ and $N_1=2$ and $N_2=1$ and under the conditions of refractive indexes shown in FIG. 8. The various values of optical thickness $n_1 d_1$ and $$\int_0^{d2} n(d) \cdot \Delta d$$

corresponding to curves 101–105 are shown in Table 2:

TABLE 2

| Curve | $n_1d_1$ | $\int_0^{d2} n(d) \cdot \Delta d$ |
|---|---|---|
| 101 | 384 mµ | 128 mµ |
| 102 | 384 | 192 |
| 103 | 480 | 160 |
| 104 | 576 | 128 |
| 105 | 576 | 192 |

As will be seen from FIGS. 9 and 10, the reflectance R of the foregoing example is generally as low as 2% or less in the visible wavelength range.

Figure 11:
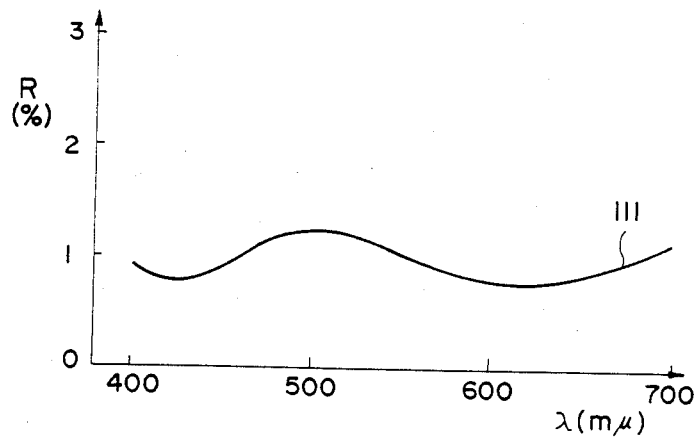

Similarly, FIG. 11 shows the spectral reflectance characteristic, in the visible wavelength range, of an electrode-substrate having the refractive indexes shown in FIG. 8 and satisfying the relation (1) for $\lambda = 640$ mµ, $N_1 = 1$ and $N_2 = 2$, and having optical thickness of $n_1d_1 = 160$ mµ and $$\int_0^{d2} n(d) \cdot \Delta d = 480 \text{ mµ}.$$

As will be seen from FIG. 11, the curve 111 shows a satisfactory reflectance R, lower than 1.3% over the visible wavelength range with the variation depending on the wavelength limited to the order of 0.5%.

Second case: in which $n_1d_1$ and $$\int_0^{d2} n(d) \cdot \Delta d$$

are so selected as to satisfy the following relation:

$$0.1(2N_1 - 1)\lambda \leq n_1d_1 \leq 0.15(2N_1 - 1)\lambda \quad (2)$$

$$0.4N_2 \leq \int_0^{d2} n(d) \cdot \Delta d \leq 0.6N_2 \lambda$$

wherein $\lambda$ is the design wavelength, and $N_1$ and $N_2$ are arbitrary positive integers.

Figure 12:
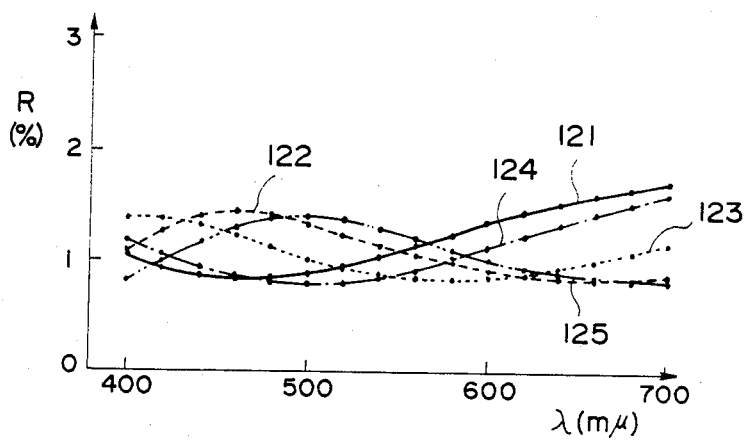
FIGS. 12 and 13 are charts showing the reflection characteristics of the electrode-substrates, belonging to a second group, of the liquid crystal devices according to present invention.

FIG. 12 shows the spectral reflectance characterics, in the visible wavelength range, of different electrode-substrates having different optical thickness satisfying the above relation (2) for a design wavelength of 520 mµ and $N_1 = N_2 = 1$ and under the conditions of refractive indexes shown in FIG. 8. The values of optical thickness $n_1d_1$ and $$\int_0^{d2} n(d) \cdot \Delta d$$

corresponding to curves 121–125 are shown in Table 3:

TABLE 3

| Curve | $n_1d_1$ | $\int_0^{d2} n(d) \cdot \Delta d$ |
|---|---|---|
| 121 | 52 mµ | 208 mµ |
| 122 | 52 | 312 |
| 123 | 65 | 260 |
| 124 | 78 | 208 |
| 125 | 78 | 312 |

As will be seen from FIG. 12, the reflectance R is generally lower than 1.5% over the visible wavelength range, with little dependence on the wavelength.

Figure 13:
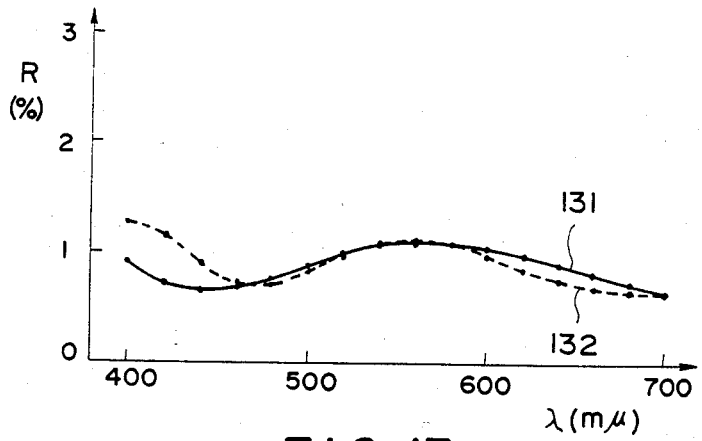

Also FIG. 13 shows the spectral reflectance characteristics, in the visible wavelength range, of electrode-substrates each having refractive indexes shown in FIG. 8 and satisfying the above relation (2) for $\lambda = 520$ mµ, $N_1 = 2$ and $N_2 = 1$ and having optical thickness $n_1d_1 = 195$ mµ and $$\int_0^{d2} n(d) \cdot \Delta d = 260 \text{ mµ (curve 131)},$$

or satisfying the above relation (2) for $\lambda = 520$ mµ, $N_1 = 2$ and $N_2 = 2$ and having optical thickness $n_1d_1 = 195$ mµ and $$\int_0^{d2} n(d) \cdot \Delta d = 520 \text{ mµ (curve 132)}.$$

As will be seen from FIG. 13, the reflectance R is satisfactorily low as it is generally below 1.3% over the visible wavelength range, with little dependence on wavelength.

Third case: in which $n_1d_1$ and $$\int_0^{d2} n(d) \cdot \Delta d$$

are so selected as to satisfy the following relation:

$$0.4N_1\lambda \leq n_1d_1 \leq 0.6N_1\lambda \quad (3)$$

$$0.2N_2\lambda \leq \int_0^{d2} n(d) \cdot \Delta d \leq 0.3N_2\lambda$$

wherein $\lambda$ is the design wavelength and $N_1$ and $N_2$ are arbitrary positive integers.

Figure 14:
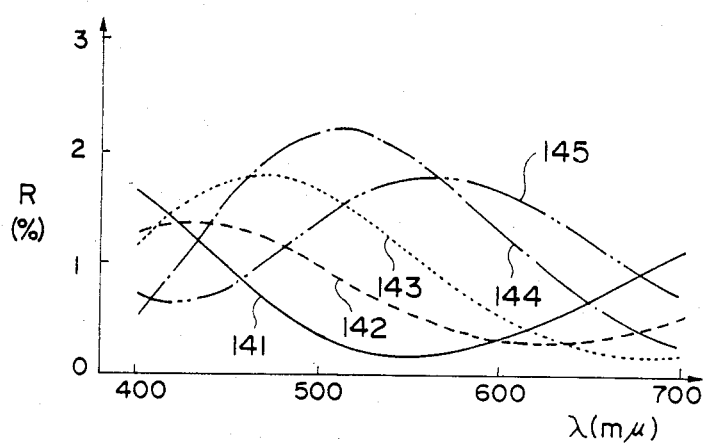
FIGS. 14 to 16 are charts showing the reflection characteristics of the electrode-substrates, belonging to a third group, of the liquid crystal devices according to the present invention.

FIG. 14 shows the spectral reflectance characteristics, in the visible wavelength range, of different electrode-substrates having different optical thickness satisfying the above relation (3) for a design wavelength of 520 mµ and for $N_1 = N_2 = 1$ and under the conditions of refractive indexes shown in FIG. 8. The values of optical thickness $n_1d_1$ and $$\int_0^{d2} n(d) \cdot \Delta d$$

are shown in Table 4:

TABLE 4

| Curve | $n_1d_1$ | $\int_0^{d2} n(d) \cdot \Delta d$ |
|---|---|---|
| 141 | 208 mµ | 104 mµ |
| 142 | 208 | 156 |
| 143 | 260 | 130 |
| 144 | 312 | 104 |
| 145 | 312 | 156 |

As will be seen from FIG. 14, the reflectance R is reduced to a level essentially less than 2% over the visible wavelength range.

Figure 15:
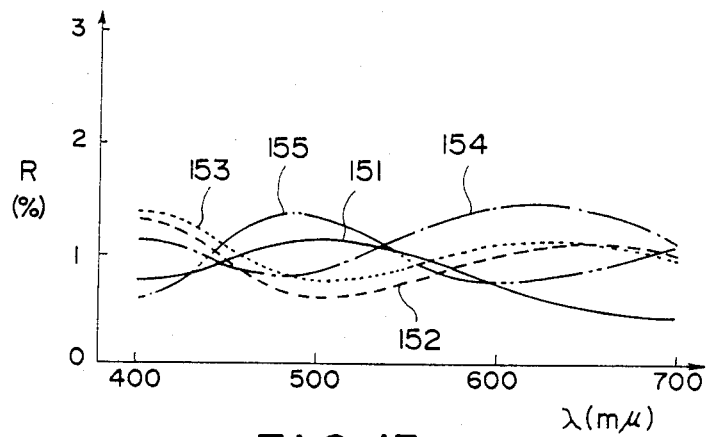

Similarly FIG. 15 shows the spectral reflectance characteristics, in the visible wavelength range, of different electrode-substrates having different optical thickness satisfying the above relation (3) for a design wavelength of 520 mμ and for $N_1=1$ and $N_2=2$ and under the conditions of refractive indexes shown in FIG. 8. The values of optical thicknesses $n_1d_1$ and $$\int_0^{d2} n(d) \cdot \Delta d$$

corresponding to curves 151-155 are shown in Table 5:

TABLE 5

| Curve | $n_1d_1$ | $\int_0^{d2} n(d) \cdot \Delta d$ |
|---|---|---|
| 151 | 208 mμ | 208 mμ |
| 152 | 208 | 312 |
| 153 | 260 | 260 |
| 154 | 312 | 208 |
| 155 | 312 | 312 |

Figure 16:
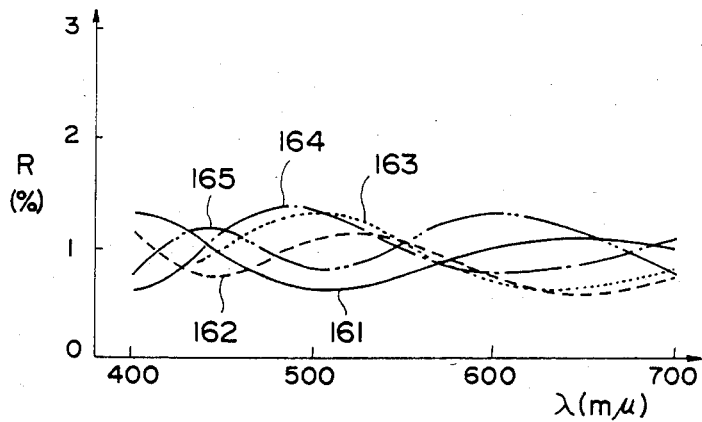

Also FIG. 16 shows the spectral reflectance characteristics, in the visible wavelength range, of different electrode-substrates having different optical thickness satisfying the above relation (3) for a design wavelength of 520 mμ and for $N_1=1$ and $N_2=3$ and under the conditions of refractive indexes shown in FIG. 8. The values of optical thicknesses $n_1d_1$ and $$\int_0^{d2} n(d) \cdot \Delta d$$

corresponding to curves 161-165 are shown in Table 6:

TABLE 6

| Curve | $n_1d_1$ | $\int_0^{d2} n(d) \cdot \Delta d$ |
|---|---|---|
| 161 | 208 mμ | 312 mμ |
| 162 | 208 | 468 |
| 163 | 260 | 390 |
| 164 | 312 | 312 |
| 165 | 312 | 468 |

As will be seen from in FIGS. 15 and 16, the curves of the foregoing examples show excellent reflectance R which is less than 1.5% over the visible wavelength range with the variation depending on the wavelength limited to the order of 1%.

Fourth case: in which $n_1d_1$ and $$\int_0^{d2} n(d) \cdot \Delta d$$

are so selected as to satisfy the following relation:

$$0.1(2N_1 - 1)\lambda \leq n_1d_1 \leq 0.15(2N_1 - 1)\lambda \quad (4)$$

$$0.32(2N_2 - 1)\lambda \leq \int_0^{d2} n(d) \cdot \Delta d \leq 0.48(2N_2 - 1)\lambda$$

wherein λ is the design wavelength and $N_1$ and $N_2$ are arbitrary positive integers.

Figure 17:
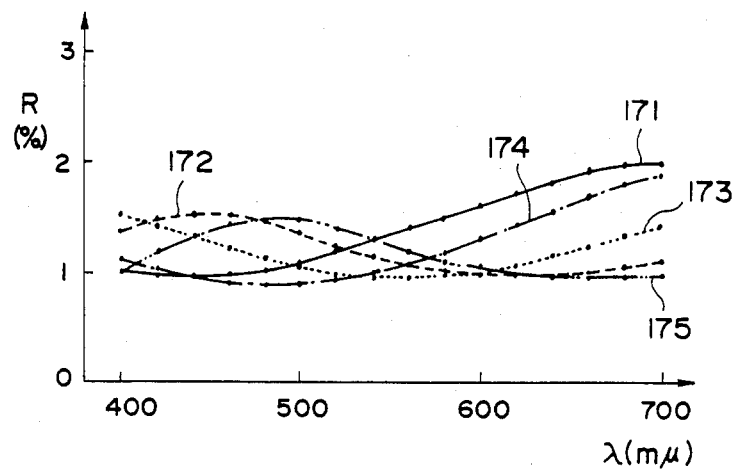
FIGS. 17 and 18 are charts showing the reflection characteristics of the electrode-substrates, belonging to a fourth group, of the liquid crystal devices according to the present invention.

FIG. 17 shows the spectral reflectance characteristics, in the visible wavelength range, of different electrode-substrates having different optical thickness satisfying the above relation (4) for a design wavelength of 600 mμ and for $N_1=N_2=1$ and under the conditions of refractive indexes shown in FIG. 8. The values of optical thicknesses $n_1d_1$ and $$\int_0^{d2} n(d) \cdot \Delta d$$

corresponding to curves 171-175 are shown in Table 7.

TABLE 7

| Curve | $n_1d_1$ | $\int_0^{d2} n(d) \cdot \Delta d$ |
|---|---|---|
| 171 | 60 mμ | 192 mμ |
| 172 | 60 | 288 |
| 173 | 75 | 240 |
| 174 | 90 | 192 |
| 175 | 90 | 288 |

As will be seen from FIG. 17, the curves 171-175 representing the foregoing examples show excellent reflectances which are less than 2% over the visible wavelength range, with the variation depending on the wavelength limited to the order of 1%.

Figure 18:
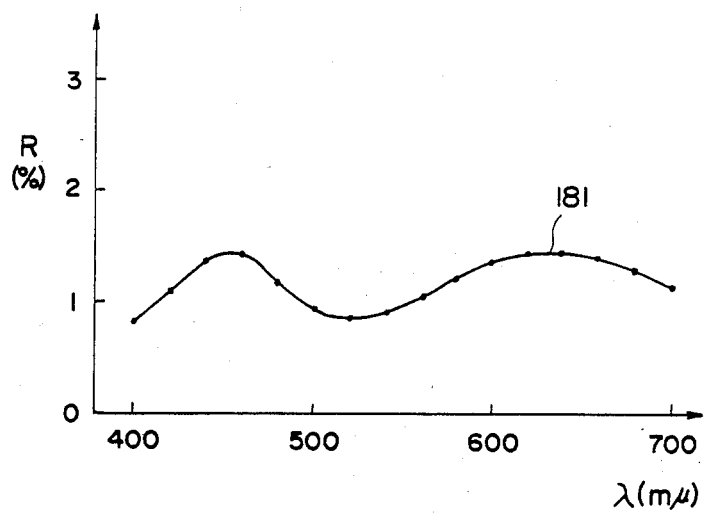

Also FIG. 18 shows the spectral reflectance characteristic (curve 181), in the visible wavelength range, of an electrode-substrate having a structure with the refractive indexes shown in FIG. 8, satisfying the above relation (4) for a design wavelength of 600 mμ and for $N_1=1$ and $N_2=2$, and having optical thickness $n_1d_1=75$ mμ and $$\int_0^{d2} n(d) \cdot \Delta d = 720 \text{ m}\mu.$$

As will be seen in FIG. 18, the curve 181 shows an excellent reflectance, which is substantially flat and less than 1.5% over the visible wavelength range, with dependence on wavelength limited approximately to 0.5%.

In the liquid crystal device explained in the foregoing, the transparent substrate 2 may be provided with a protective coating without any practical change in the refractive index or in the reflectance if the protective coating material is composed of a transparent inorganic substance of a refractive index same as or close to the refractive index $n_0$ of the substrate 2. Consequently, in case the transparent substrate is composed of glass containing alkali ions which may deteriorate the performance of the liquid crystal, it is desirable to coat the surface of said glass substrate with a transparent inorganic substance of a refractive index substantially equal to that of said substrate. For example, in case the transparent substrate is composed of glass with a refractive index of 1.52, it is desirable to coat the surface thereof with $SiO_2$ which is a transparent inorganic substance with a refractive index of about 1.48.

As examples of the materials usable in the present invention, the transparent substrate 2 can be composed of glass such as soda lime glass, barium crown glass, barium flint glass, dense barium crown glass, flint glass or dense flint glass or a plastic material such as polymethyl methacrylate (acrylic resin), polyester, polystyrene or polycarbonate. Also the transparent electrode 3 can be composed of $In_2O_3$, $SnO_2$ or $In_2O_3$ added with $SnO_2$, while the thin dielectric layer 4 can be composed of SiO, $CeO_2$, $TiO_2$, $Al_2O_3$, a polyimide resin or a polyamide-imide resin, and the liquid crystal 5 can be of nematic type.

Said thin dielectric layer 4 can maintain the desired optical property even after it is surfacially subjected to an orienting treatment such as rubbing in order to orient the liquid crystal, or even when it is subjected to a primary treatment such as silane finishing in order to increase the adhesion between the thin dielectric layer 4 and the transparent electrode 3.

Said transparent electrode 3 and said thin dielectric layer 4 can be formed for example by vacuum deposition, sputtering, ion plating, dip coating, spinner coating or chemical vapor deposition.

Changing the refractive index of said then dielectric layer 4 in the direction of thickness thereof can be attained for example by:

(i) changing the temperature of the substrate or changing the composition of remaining gas, during the vacuum deposition process;
(ii) injecting desired ions into the thin dielectric layer;
(iii) spinner coating while varying substrate temperature; and
(iv) chemical vapor deposition while varying substrate temperature.

As explained in the foregoing, the liquid crystal device of the present invention allows to significantly reduce the light reflection from the electrode pattern. In addition, decreasing the refractive index of the thin dielectric layer from a side thereof facing the electrode toward the other side facing the liquid crystal results in a lower density of the dielectric layer at its side facing the liquid crystal, thereby facilitating the orienting treatment such as rubbing, and thus enhancing the orientation of the liquid crystal.

I claim:

1. A liquid crystal device with an anti-reflection function comprising:
   a liquid crystal; and
   two electrode-substrates so positioned as to sandwich said liquid crystal therebetween, at least one of said substrates including a transparent substrate, a transparent electrode provided thereon, and a dielectric layer provided on said electrode and facing said liquid crystal, said dielectric layer comprising a single layer and having a refractive index which decreases in the direction of thickness thereof from the side of said transparent electrode toward the side of said liquid crystal to reduce the light in the visible wavelength range to be reflected by said electrode.

2. A liquid crystal device according to claim 1, wherein the device satisfies the following relation: $n_0 < n_1$ and $n_3 > n_{LC}$, where $n_0$ is the refractive index of said transparent substrate, $n_1$ is that of said transparent electrode, $n_3$ is that of said dielectric layer at a side thereof facing the liquid crystal, and $n_{LC}$ is that of the liquid crystal.

3. A liquid crystal device according to claim 1 or 2, wherein the optical thickness of said transparent electrode and said dielectric layer satisfy the following relation:

$$0.2(2N_1 - 1)\lambda \leq n_1 d_1 \leq 0.3(2N_1 - 1)\lambda$$

$$0.2(2N_2 - 1)\lambda \leq \int_0^{d2} n(d)\Delta d \leq 0.3(2N_2 - 1)\lambda$$

where $d_1$ is the geometrical thickness of said transparent electrode, $n(d)$ is the refractive index of said dielectric layer, $d_2$ is the geometrical thickness thereof, $\lambda$ is the design wavelength, and $N_1$ and $N_2$ are arbitrary positive integers.

4. A liquid crystal device according to claim 1 or 2, wherein the optical thickness of said transparent electrode and said dielectric layer satisfy the following relation:

$$0.1(2N_1 - 1)\lambda \leq n_1 d_1 \leq 0.15(2N_1 - 1)\lambda$$

$$0.4N_2\lambda \leq \int_0^{d2} n(d)\Delta d \leq 0.6N_2\lambda$$

where $d_1$ is the geometrical thickness of said transparent electrode, $n(d)$ is the refractive index of said dielectric layer, $d_2$ is the geometrical thickness thereof, $\lambda$ is the design wavelength, and $N_1$ and $N_2$ are arbitrary positive integers.

5. A liquid crystal device according to claim 1 or 2, wherein the optical thickness of said transparent electrode and said dielectric layer satisfy following relation:

$$0.4N_1\lambda \leq n_1 d_1 \leq 0.6N_1$$

$$0.2N_2\lambda \leq \int_0^{d2} n(d)\Delta d \leq 0.3N_2$$

where $d_1$ is the geometrical thickness of said transparent electrode, $n(d)$ is the refractive index of said dielectric layer, $d_2$ is the geometrical thickness thereof, $\lambda$ is the design wavelength, and $N_1$ and $N_2$ are arbitrary positive integers.

6. A liquid crystal device according to claim 1 or 2, wherein the optical thicknesses of said transparent electrode and said dielectric layer satisfy following relation:

$$0.1(2N_1 - 1)\lambda \leq n_1 d_1 \leq 0.15(2N_1 - 1)\lambda$$

$$0.32(2N_2 - 1)\lambda \leq \int_0^{d2} n(d)\Delta d \leq 0.48(2N_2 - 1)\lambda$$

where $d_1$ is the geometrical thickness of said transparent electrode, $n(d)$ is the refractive index of said dielectric layer, $d_2$ is the geometrical thickness thereof, $\lambda$ is the design wavelength, and $N_1$ and $N_2$ are arbitrary positive integers.

* * * * *